April 16, 1929.                S. D. FARMER ET AL                1,709,254
                    AUTOMATIC BRAKE CONTROL FOR VEHICLES
                           Filed April 17, 1928

Inventors
Silas D. Farmer
Samuel D. Farmer
By Watson E. Coleman Attorney

Patented Apr. 16, 1929.

1,709,254

UNITED STATES PATENT OFFICE.

SILAS D. FARMER AND SAMUEL D. FARMER, OF OKMULGEE, OKLAHOMA.

AUTOMATIC BRAKE CONTROL FOR VEHICLES.

Application filed April 17, 1928. Serial No. 270,753.

This invention relates to automatic brake controls for vehicles and more particularly to a device permitting control of the brake pedal of the vehicle from the clutch pedal thereof.

As is well known, motor vehicles are provided with two pedals, one controlling the clutch and the other the foot brake and in stopping the vehicle, it is necessary to depress the brake pedal and the clutch pedal. Where the stop is made in traffic and the engine is kept in operation, it is necessary to hold both of these pedals depressed and this as awkward and inconvenient. Accordingly, an important object of the invention is to provide a construction enabling one of these pedals to be held in its depressed position by the other pedal.

A further object of the invention is to provide a construction of this character such that when the holding pedal is released, the second pedal will not be suddenly released but will gradually return to its normal position.

These and other objects we attain by the construction shown in the accompanying drawing, wherein for the purpose of illustration is shown a preferred embodiment of our invention and wherein:—

Figure 1:
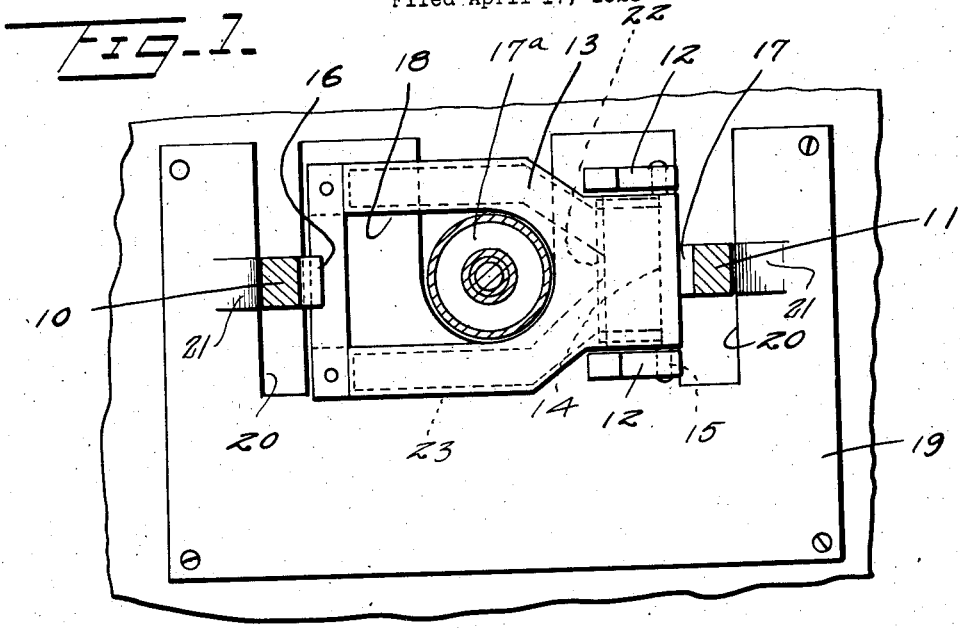
Figure 1 is a sectional view showing brake control apparatus constructed in accordance with our invention.
Figure 2:
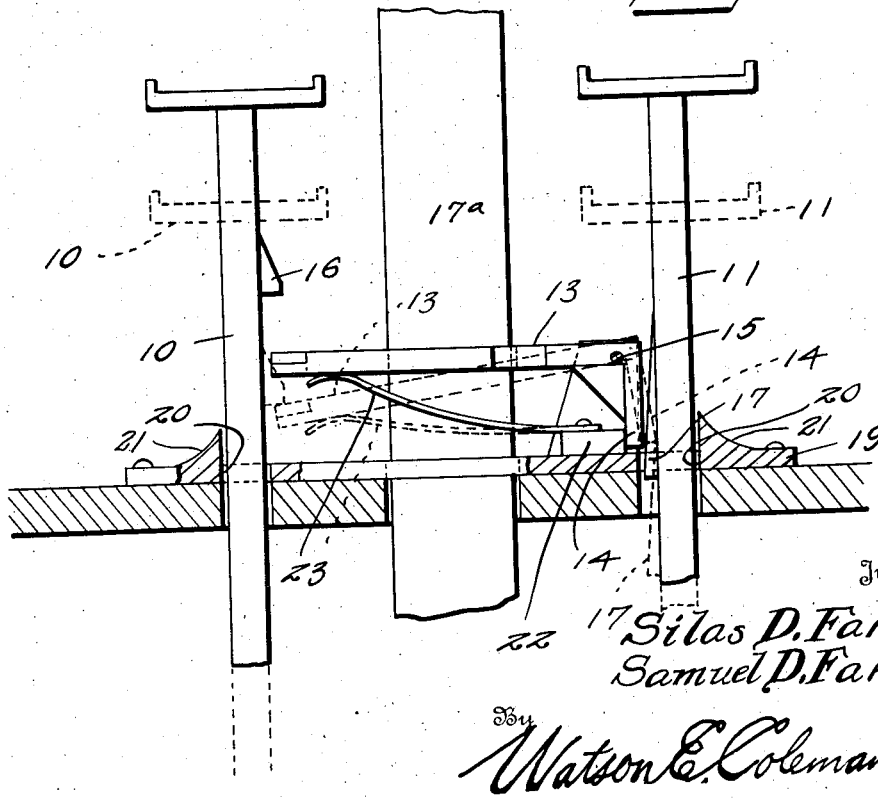
Figure 2 is a rear elevation thereof.

Referring now more particularly to the drawing, the numeral 10 indicates the clutch pedal and 11 the brake pedal of an automobile. In accordance with our invention, we secure upon the vehicle deck a standard 12 to which is pivoted a bell crank lever having a long arm 13 substantially equal in length to the distance between the pedals and a short arm 14 extending at substantially right angles to the long arm and projecting downwardly therefrom. The pivotal connection of this lever which is indicated at 15 is disposed at one end of the long arm and adjacent the brake pedal 11. The clutch pedal has applied to its inner face a lug 16 adapted to engage the free end of the long arm with the result that when the clutch pedal is depressed, the short arm of the lever is swung into engagement with the adjacent face of the brake pedal, acting as a friction latch to hold the same in position.

In order that the brake pedal will not be suddenly released as the clutch is withdrawn, the inner face of the brake pedal is preferably provided with a longitudinally extending wedge cam 17 against which the short arm of the lever engages. This wedge cam will cause a gradual release and prevent noisy operation in return movements of the brake pedal. As in many cases, the steering post 17 of the vehicle is interposed directly between the clutch and brake pedals, it may, in some instances, be necessary to slot the long arm, as indicated at 18, to accommodate the same. The entire structure is preferably mounted upon a plate 19 which is slotted, as at 20, for the passage of the clutch and brake pedals.

This plate is preferably provided outwardly of the pedals 10 and 11 with lugs 21 reinforcing the plate to prevent separation of the pedals and with a further lug 22 against which the short arm 14 engages to limit its movement under the influence of the spring 23 which withdraws it from engagement with the brake pedal.

Since the construction hereinbefore set forth is capable of a certain range of change and modification without materially departing from the spirit of the invention, we do not limit ourselves to such specific structure except as hereinafter claimed.

We claim:—

1. In combination with a pair of foot pedals, a support, a bell crank lever pivoted to the support and having an arm paralleling one of said pedals and a second arm extending from the first named pedal to the other pedal, the last named pedal having means engaging said arm as the pedal is depressed to force the first named arm into engagement with the first named pedal to lock the same against longitudinal movement.

2. In combination with a pair of foot pedals, a support, a bell crank lever pivoted to the support and having an arm paralleling one of said pedals and a second arm extending from the first named pedal to the other pedal, the last named pedal having means engaging said arm as the pedal is depressed to force the first named arm into engagement with the first named pedal to lock the same against longitudinal movement, and a spring normally maintaining the first named arm of the lever out of engagement with the first named pedal.

3. In combination with a pair of foot pedals, a support, a bell crank lever pivoted to the support and having an arm paralleling one of said pedals and a second arm extending from the first named pedal to the other pedal, the last named pedal having means engaging said arm as the pedal is depressed to force the first named arm into engagement with the first named pedal to lock the same against longitudinal movement, the first named pedal having a tapered cam with which said arm engages.

4. In combination with spaced foot pedals, a support, a latch carried by the support and having its opposite ends arranged adjacent said pedals and means upon one of said pedals engaging the adjacent end of the latch as the pedal is depressed to force the opposite end thereof into engagement with the other of the pedals, the last named pedal having a tapered cam with which said latch engages.

5. In combination with a pair of foot pedals, a support, a bell crank lever pivoted to the support and having an arm paralleling one of said pedals and a second arm extending from the first named pedal to the other pedal, the last named pedal having means engaging said arm as the pedal is depressed to force the first named arm into engagement with the first named pedal to lock the same against longitudinal movement, the first named pedal having a tapered cam with which said arm engages, a spring normally maintaining the first named arm out of engagement with the first named pedal.

In testimony whereof we hereunto affix our signatures.

SILAS D. FARMER.
SAMUEL D. FARMER.